(12) United States Patent
Negrassus et al.

(10) Patent No.: US 8,498,988 B2
(45) Date of Patent: Jul. 30, 2013

(54) FAST SEARCH

(75) Inventors: Sven Negrassus, Zurich (CH); Beat Meier, Uitikon (CH)

(73) Assignee: SAP AG, Walldorf (DE)

( * ) Notice: Subject to any disclaimer, the term of this patent is extended or adjusted under 35 U.S.C. 154(b) by 182 days.

(21) Appl. No.: 12/749,732

(22) Filed: Mar. 30, 2010

(65) Prior Publication Data

US 2011/0246470 A1  Oct. 6, 2011

(51) Int. Cl.
*G06F 17/30* (2006.01)
(52) U.S. Cl.
USPC .......................................... 707/741
(58) Field of Classification Search
USPC ................................. 707/741, 774
See application file for complete search history.

(56) References Cited

U.S. PATENT DOCUMENTS

| | | | |
|---|---|---|---|
| 6,556,990 B1 | 4/2003 | Lane | |
| 6,785,677 B1 * | 8/2004 | Fritchman | 1/1 |
| 7,305,385 B1 | 12/2007 | Dzikiewicz et al. | |
| 7,865,509 B2 * | 1/2011 | Barsness et al. | 707/741 |

OTHER PUBLICATIONS

European Search Report dated Aug. 17, 2011 issued in corresponding EP Application No. EP 11 002 363.7.
Agrawal L., et al., "DBXplorer: A System for Keyword-Based Search Over Relational Databases", Proceeding of the 18th International Conference on Data Engineering, vol. Conf. 18, 2002, 5-16.
Gravano, L., et al., "Bulletin of the Technical Committee on Data Engineering", TCDE, vol. 24, No. 4, Dec. 2011.

* cited by examiner

*Primary Examiner* — Huawen Peng
(74) *Attorney, Agent, or Firm* — Kenyon & Kenyon LLP

(57) ABSTRACT

Data records in one or more databases may be scanned to create a search index. The search index may include an identifier for each data record scanned, and a list of fragments of data in one or more data fields of each scanned data record. Each fragment in the list may be created by extracting a fixed number of adjoining characters from data in each data field of a corresponding data record. The list of fragments may include all fixed number of adjoining character sequences in each data field of a data record. Multiple search indexes may be included, with each search index including a different fixed number of adjoining characters in the fragment list. Systems and methods may be provided.

15 Claims, 10 Drawing Sheets

FIG. 1

| Table 110 | | | |
|---|---|---|---|
| PARTICIPANT_ID | NAME1 | NAME2 | CITY |
| ... | ... | ... | ... |
| <participant_123> | Meierhans | Paul | Zürich |
| <participant_xyz> | Müller | Hans | Bern |
| <participant_zzz> | Notter | Peter | Hansestadt |
| ... | ... | ... | ... |

Table 150  PARTICIPANT_ID  ...
Table 140  PARTICIPANT_ID  CustomerNumber
Table 130  PARTICIPANT_ID  PhoneNumber

| Table 120 | |
|---|---|
| PARTICIPANT_ID | Email |
| ... | ... |
| <participant_123> | meierhans@... |
| <participant_xyz> | h.mueller@... |
| <participant_zzz> | notter@... |
| ... | ... |

FIG. 2

Table 210

| PARTICIPANT_ID | NAME1 | NAME2 | CITY |
|---|---|---|---|
| ... | ... | ... | ... |
| <participant_A> | Sam | Safari | Walldorf |
| <participant_B> | Tony | Stone | Waldallee |
| ... | ... | ... | ... |

Fields 211 →
Data Record 212 →
Data Record 213 →

FIG. 3

|   | S | A | F | A | R | I |
|---|---|---|---|---|---|---|
| → SAF | S | A | F |   |   |   |
| → AFA |   | A | F | A |   |   |
| → FAR |   |   | F | A | R |   |
| → ARI |   |   |   | A | R | I |

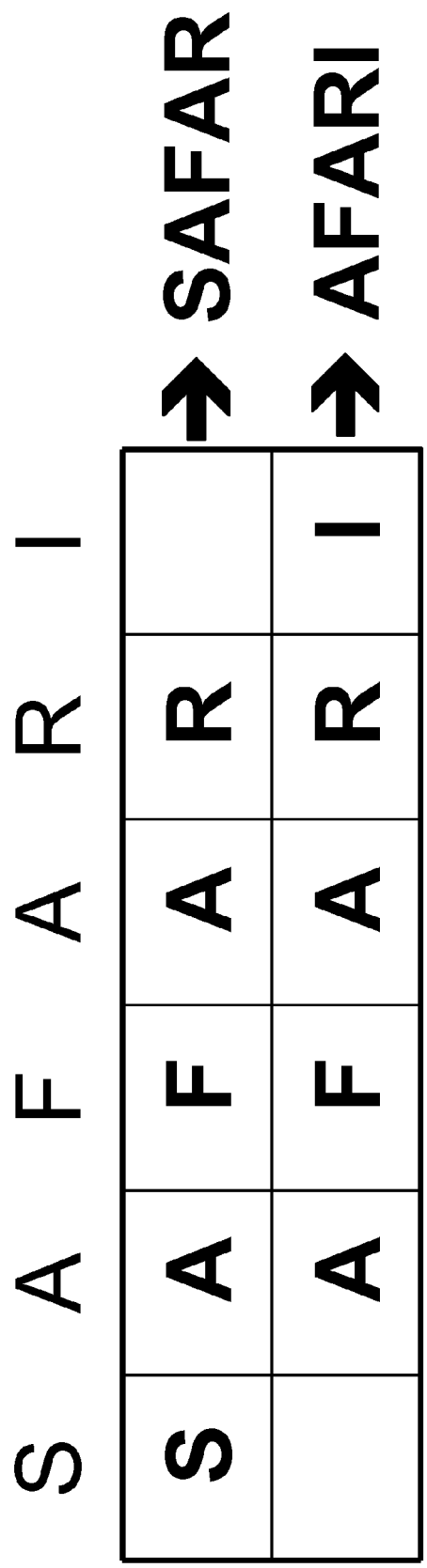

FIG. 5

| RECORD IDENTIFIER | CHARACTER FRAGMENT |
|---|---|
| <participant_A> | SAM |
| <participant_A> | SAF |
| <participant_A> | AFA |
| <participant_A> | FAR |
| <participant_A> | ARI |
| <participant_A> | WAL |
| <participant_A> | ALL |
| <participant_A> | LLD |
| <participant_A> | LDO |
| <participant_A> | DOR |
| <participant_A> | ORF |
| <participant_B> | TON |
| <participant_B> | ONY |
| <participant_B> | STO |
| <participant_B> | ONE |
| <participant_B> | WAL |
| <participant_B> | ALD |
| <participant_B> | LDA |
| <participant_B> | DAL |
| <participant_B> | ALL |
| <participant_B> | LLE |
| <participant_B> | LEE |

FIG. 6

| RECORD IDENTIFIER | CHARACTER FRAGMENT |
|---|---|
| <participant_A> | SAFAR |
| <participant_A> | AFARI |
| <participant_A> | WALLD |
| <participant_A> | ALLDO |
| <participant_A> | LLDOR |
| <participant_A> | LDORF |
| <participant_B> | STONE |
| <participant_B> | WALDA |
| <participant_B> | ALDAL |
| <participant_B> | LDALL |
| <participant_B> | DALLE |
| <participant_B> | ALLEE |

FAST SEARCH

BACKGROUND

Many businesses use multiple databases and applications to store vast amounts of data. For example, an organization may use a customer relationship management system database to store contact information for thousands or even hundreds of thousands of customers. Additional customer contact information may also be stored in other systems, such as an accounts payable system database or business intelligence system data warehouse. As organizations increase the number of databases and amount of data being stored, it becomes increasingly time consuming to search for specific data.

FIG. 1, for example, shows several database tables 110, 120, 130, 140, and 150. Each of these database tables may be stored in one or more databases on one or more computing systems. For example, table 110 may be stored in a first computing system, while tables 120 and 130 may be stored in a second computing system. Each of these computing systems may store, structure, and format the database tables differently. As the number of tables and computing system structures increases, it takes longer to search through data in each of the tables for specific information.

Even if the data is stored in a single table on a single system, data searches take longer as the table size increases. For example, searching multiple data fields, such as NAME1, NAME2, and CITY, in table 110 for partial entries with the letters "hans" can take several seconds or longer as the number of entries stored in the table increases. One common reason is because in this type of search, a SQL "like" statement is typically used, which requires a full scan of data fields. These full scans cannot typically be expedited using database indexes or other similar techniques. The longer data searches take, the more dissatisfied and impatient users become.

There is a need for faster searching of multiple data fields in databases storing large amounts of data.

BRIEF DESCRIPTION OF THE DRAWINGS

FIG. 1 shows several database tables.

FIG. 2 shows an exemplary database table including data fields and records.

FIG. 3 shows an exemplary 3 character fragment parsing of data.

FIG. 4 shows an exemplary 5 character fragment parsing of data.

FIG. 5 shows an exemplary 3 character fragment search index.

FIG. 6 shows an exemplary 5 character fragment search index.

DETAILED DESCRIPTION

Figure 7:
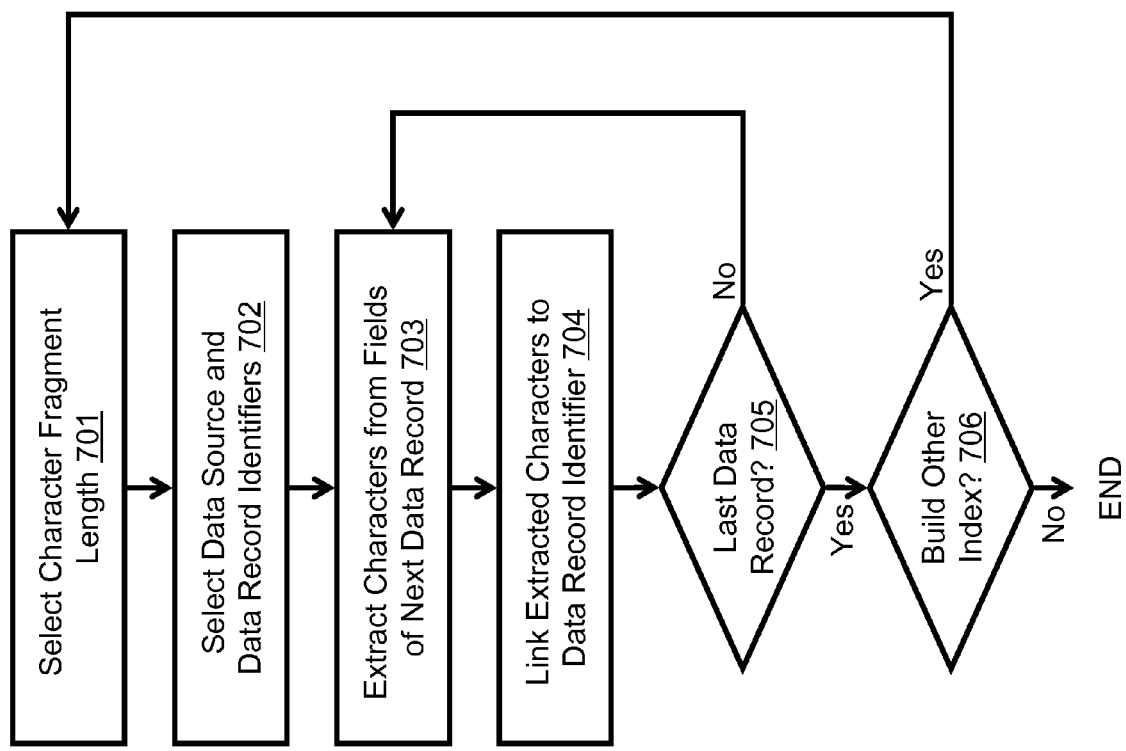
FIG. 7 shows an exemplary method for generating a search index.

In an embodiment of the invention, data records in one or more databases may be scanned to create a search index. The search index may include an identifier for each data record scanned, and a list of fragments of data in one or more data fields of each scanned data record. Each fragment in the list may be created by extracting a fixed number of adjoining characters from data in each data field of a corresponding data record. The list of fragments may include all fixed number of adjoining character sequences in each data field of a data record. An embodiment may also include multiple search indexes, with each search index including a different fixed number of adjoining characters in the fragment list. Alternatively, a single integrated search index may be created that includes extracted adjoining characters of different lengths in the fragment list.

To execute a search, a user may enter multiple search terms in a single search field. Each search term may then be compared to the fragments in the search index. Because the fragments are extracted from each data field in each data record, the comparison of each search term to each fragment will result in checking each search term for matches in each data field. Thus, a single search field may be used to search all data fields in a data source without the user having to identify particular data fields to be searched.

In an embodiment, a method may include selecting a character fragment length, extracting each sequence of adjoining characters having the selected length from each data field at least equal to the selected length in each data record of a data source through the processing device, and linking each extracted sequence to an identifier of the respective data record in a search index through the processing device. When the selected character fragment length is greater than a smallest word length in the data source, words in the data source having a length less than the selected character fragment length may be extracted from the data source and included in the search index.

Another method may also involve calculating a number of characters in a search term through the processing device, selecting a search index for a designated data source having a closet character fragment length at most equal to the calculated number of characters through the processing device, each search index including a plurality of data records identifiers linked to respective fixed-length character fragments, each fragment consisting of extracted sequences of adjoining characters having the fixed-length from data fields of respective data records, and designating a data record identifier in the selected search index having a respective fixed-length character fragment matching adjoining characters in the search term as responsive to the search term.

FIG. 2 shows an exemplary database table 210 including data fields 211 and records 212 and 213. During the process of creating a search index for this exemplary table 210, the fields 211 of the table 210 may be scanned for a field containing a data record identifier. The field or fields containing a data record identifier may be so designated in a database containing the table 210. Alternatively, the identifiers for each data record may be obtained through a lookup table, or a secondary table linked to the database table 210. In some embodiments, a specific field, such as the first field in a database table, may be designated as the field containing data record identifiers. In the example shown in FIG. 2, the PARTICIPANT_ID field may contain the identifiers for data records 212 and 213.

In an embodiment, a processing device may scan the other data fields of one or more databases and data tables before or after identifying the data record identifiers. During the scanning, the processing device may scan each of these fields, such as the NAME1, NAME2, and CITY fields 211 in table 210, and extract certain adjoining character sequences from each field. For example, if the search index being created is for n=3 character fragments, the processing device may parse three adjoining character sequences from the data in data fields of a database. If the search index is being created for n=5 character fragments, the processing device may parse five adjoining character sequences from the data in the data fields. In an embodiment, the processing device may parse and extract every adjoining character sequence of data in each data field.

Figure 3:
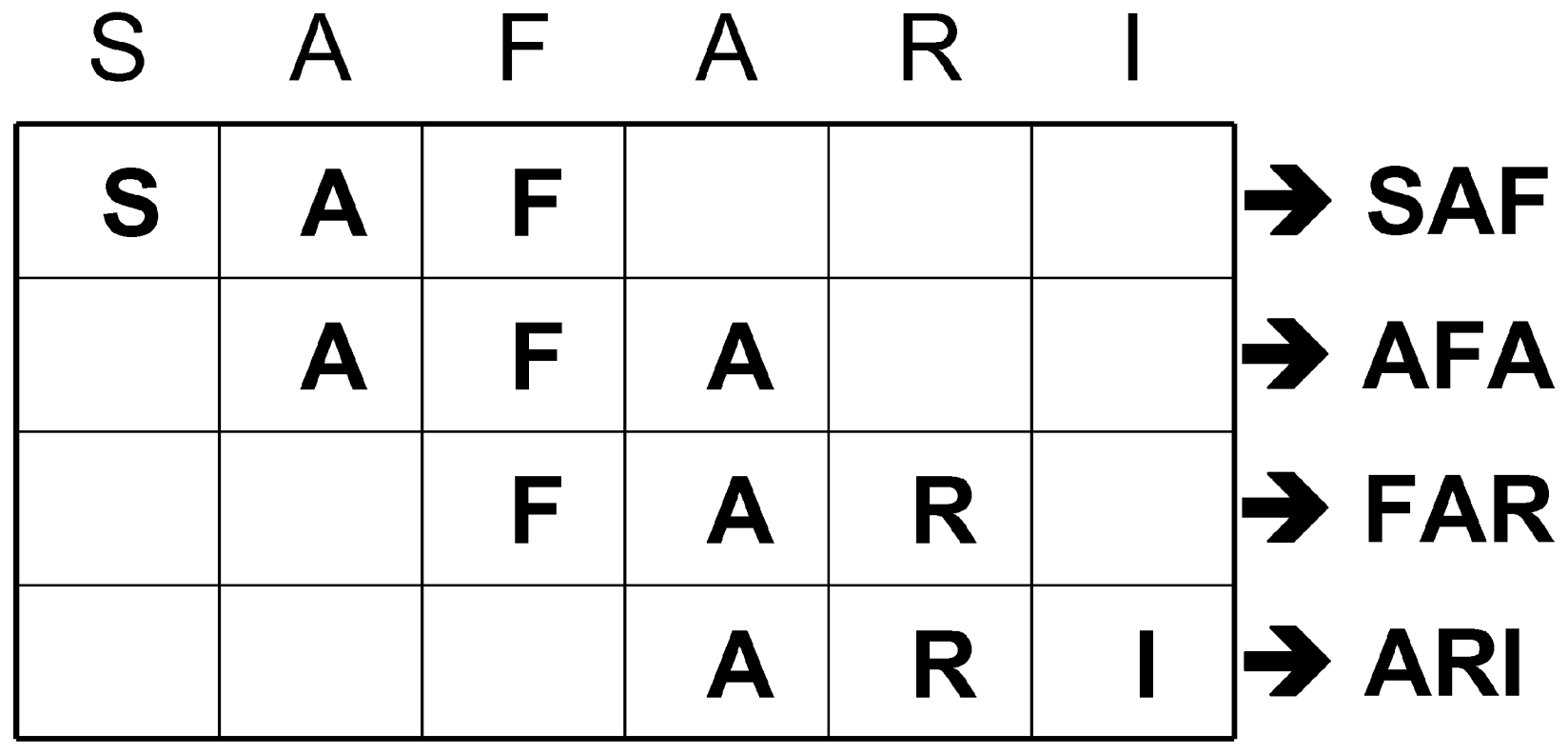

FIG. 3 shows an exemplary 3 character fragment parsing of the data "SAFARI" in the NAME2 field 211 of data record 212. In this example, the first three-adjoining character combination in the word "SAFARI" is "SAF", so this may be a first extracted fragment. The next three-adjoining character combination in the word "SAFARI" is "AFA", so this may be a second extracted fragment. The next three-adjoining character combination in the word "SAFARI" is "FAR", so this may be a third extracted fragment. The final three-adjoining character combination in the word "SAFARI" is "ARI", so this may be the last extracted fragment. Since there are no more three-adjoining character fragments in the word "SAFARI", the 3 character fragment parsing of "SAFARI" is complete and the processing device may continue processing other data in the database.

FIG. 4 shows an exemplary 5 character fragment parsing of the data "SAFARI" in the NAME2 field 211 of data record 212. In this example, the first five-adjoining character combination in the word "SAFARI" is "SAFAR", so this may be a first extracted fragment. The next and last five-adjoining character combination in the word "SAFARI" is "AFARI", so this may be a second extracted fragment. Since there are no more five-adjoining character fragments in the word "SAFARI", the 5 character fragment parsing of "SAFARI" is complete and the processing device may continue processing other data in the database.

The search index may be constructed in an embodiment from scanning, parsing, and extracting the character fragments. The search index may be created by associating a data record identifier with all of the extracted character fragment combinations in the corresponding data record. FIG. 5 shows an exemplary 3 character fragment search index for the data records 212 and 213. In this search index, the data record identifier "<participant_A>" for data record 212 may be associated with each of the three-adjoining character fragment combinations of data in each of the remaining fields in the table 210, which may include the fragments SAM for field NAME1; SAF, AFA, FAR, ARI, for field NAME2; and WAL, ALL, LLD, LDO, DOR, ORF, for field CITY. In the same 3 character fragment search index, the data record identifier "<participant_B>" for data record 213 may be associated with each of the three-adjoining character fragment combinations of data in each of the remaining field in the table 210, which may include the fragments TON, ONY for field NAME1; STO, TON, ONE, for field NAME2; and WAL, ALD, LDA, DAL, ALL, LLE, LEE for field CITY. In an embodiment, duplicate fragment combinations associated with a particular data record identifier may be removed from the index to save space and processing time. Thus, in one embodiment, the fragment TON associated with the <participant_B> identifier may only be stored once in the search index event though it may have been parsed twice, once from field NAME1 and again from field NAME2. In other embodiments, the character fragment and data record identifiers may be organized differently.

FIG. 6 shows an exemplary 5 character fragment search index for the data records 212 and 213. In this search index, the data record identifier "<participant_A>" for data record 212 may be associated with each of the five-adjoining character fragment combinations of data in each of the remaining field in the table 210, which may include the fragments SAFAR, AFARI, for field NAME2; and WALLD, ALLDO, LLDOR, LDORF for field CITY. Since the field NAME1 has data ("SAM") that is less than five characters, this field may not contribute any fragments to this search index. In the same 5 character fragment search index, the data record identifier "<participant_B>" for data record 213 may be associated with each of the three-adjoining character fragment combinations of data in each of the remaining fields in the table 210, which may include the fragments STONE for field NAME2; and WALDA, ALDAL, LDALL, DALLE, ALLEE for field CITY. Since the field NAME1 has data ("TONY") that is less than five characters, this field may not contribute any fragments to this search index.

In other embodiments, the character fragment and data record identifiers may be organized differently. For example, in some search indexes, all of the fragments may be stored in a single index regardless of the lengths of each fragment. Thus, another search index for the data records 212 and 213 may include an integrated version of the indexes shown in FIGS. 5 and 6 into a single index. The length of character fragments in the index may be considered when searching for fragments matching a search term. Splitting a single search index into multiple indexes may increase performance by lowering memory consumption and reducing the amount of records to be searched. These performance gains from splitting the search index may increase as the size of the index grows.

FIG. 7 shows an exemplary method for generating a search index. In box 701, a first character fragment length is selected. In box 702, a database and identifiers of data records in the database are selected. As discussed previously, the identifiers may be automatically selected through a pre-existing code or designation in the database; through a lookup table correlating specific identifiers with specific databases, tables, or data records; or through secondary tables linked to the selected database. In box 703, adjoining character fragment combinations of the selected length may be extracted from the database fields of a data record.

In box 704, the extracted fragments may be inserted in the search index and linked to the identifier of the corresponding data record from which the fragments were extracted. In an embodiment, duplicate fragment combinations associated with a particular data record identifier may be removed from the index to save space and reduce processing time.

In box 705, a check may be performed to determine if there are remaining data records to be processed. If there are still data records to be processed, the process may return to box 703 to extract data from the next data record in the data base. If all of the data records in the database have been processed, the process may continue to box 706.

In box 706, a check may be performed to determine if additional search indexes are to be created. If so, the process may return to box 701, where the same or a different character fragment length for the new search index may be selected. At box 702, other databases and/or data record identifiers may also be selected for the new search index. If no additional search indexes are to be created, the process may end.

Figure 8:
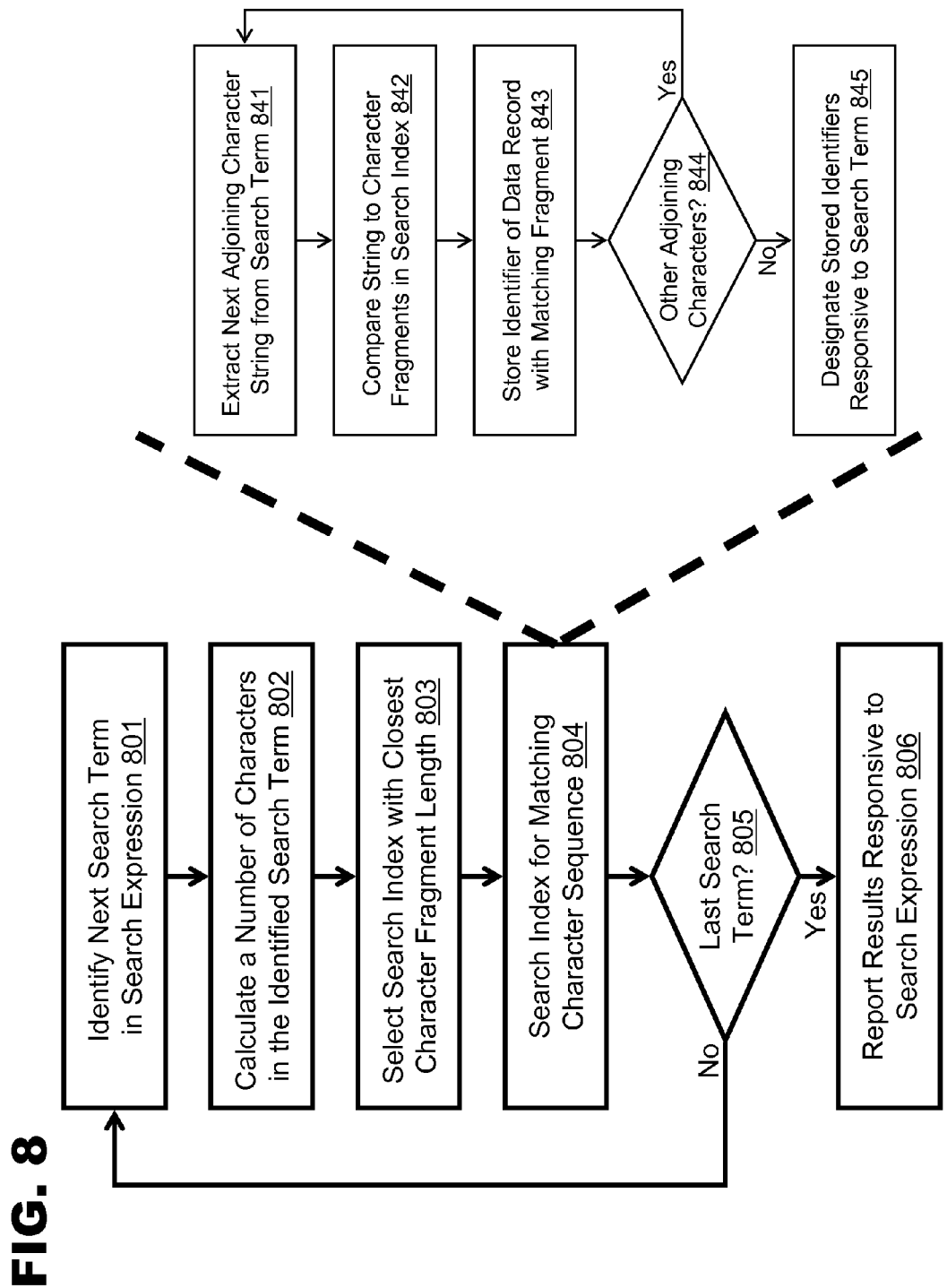
FIG. 8 shows an exemplary process for conducting a search of particular data records using the search index.

After a search index has been created, a user may enter a search expression for searching data records. Alternatively, an automated computer process on a first computing system may send a search expression to a second computing system to find particular data records. FIG. 8 shows an exemplary process for conducting a search of particular data records using the search index created as described previously, as may be performed by a processing device.

In box 801, a search expression may be parsed to identify one or more search terms in the search expression and select a search term to be processed. Each of the search terms in the search expression may be identified by looking for unique character(s) separating the search terms. For example, a space, a comma, a semicolon, or other alphanumeric character could used to distinguish between search terms in a search expression. In some embodiments, a lookup table may used to identify alphanumeric characters, field codes, variables, conditions, or other forms used to identify different search terms in a search expression. In another embodiment, each search term may contain a fixed number of characters, so that, for example, the first x characters of a search expression could be a first search term, and so on.

In box 802, the number of characters in the selected search term may be calculated. In box 803, a search index for the data source to be searched is selected. In an embodiment, search index having a character fragment length closest to, without exceeding, the number of the characters in the selected search term may be selected.

In box 804, the character fragments in the selected search index are compared to the search term to identify matches in the search index, and the data record identifiers linked to the matches may be designated as responsive to the search. In an embodiment, if the number of characters in the search term is greater than the length of the character fragments in the search index, the search term may be subdivided into various combinations of adjoining characters equaling the search index character fragment length, and a comparison may be conducted using each of the various combinations to identify responsive results of the search.

Boxes 841 to 845 show an exemplary search process in an embodiment when the number of characters in the search term is greater than the length of the character fragments in the selected search index. In box 841, a first string of adjoining characters equal in length to that of the character fragments in the selected search index may be extracted from the search term. In some embodiments, this extraction may be done in a manner similar to that shown in FIGS. 3 and 4. In box 842, the extracted string is compared to the character fragments in the selected search index to identify matching fragments.

In box 843, a data record identifier of the data records in the search index having matching fragments may be so designated in a memory. In box 844, the search term may be checked for additional unique adjoining character strings equal in length to the length of the search index character fragments. If there is such an additional unique adjoining character string in the search term, the process may repeat in box 841 using the additional unique adjoining character string. In some embodiments, this process may be similar to that shown in FIGS. 3 and 4.

Once all of the unique adjoining character strings of the search term equal in the length to that of the search index character fragments have been so processed, the process may continue to box 845. In box 845, the data record identifiers previously designated as having matching fragments for each and every unique adjoining search term character string may be further designated as being responsive to the search.

In an embodiment, the intersection of those data identifiers having matching fragments (boxes 842 and 843) for each unique adjoining search term character string equal in length to the search index character fragments may be designated as responsive to the search. A determination of the intersection of these data identifiers may also be done each time a matching fragment linked to a data record identifier is identified instead of waiting until all unique adjoining character strings have been processed.

In box 805, the search expression may be checked for additional search terms. If there are additional search terms to be considered, one of these additional search terms may be selected and the process may go to box 801. Once all search terms have been considered, the process may go to box 806.

In box 806, the designated data identifiers responsive to the search may be reported. The results may be reported in any manner, including as text in a file, on a screen, or in a memory. The results may be stored in a database, in a data table, or other data structure or format. The results may also be shown visually, such as in a chart or as part of a graph. The results may be exported to another application.

Figure 9:
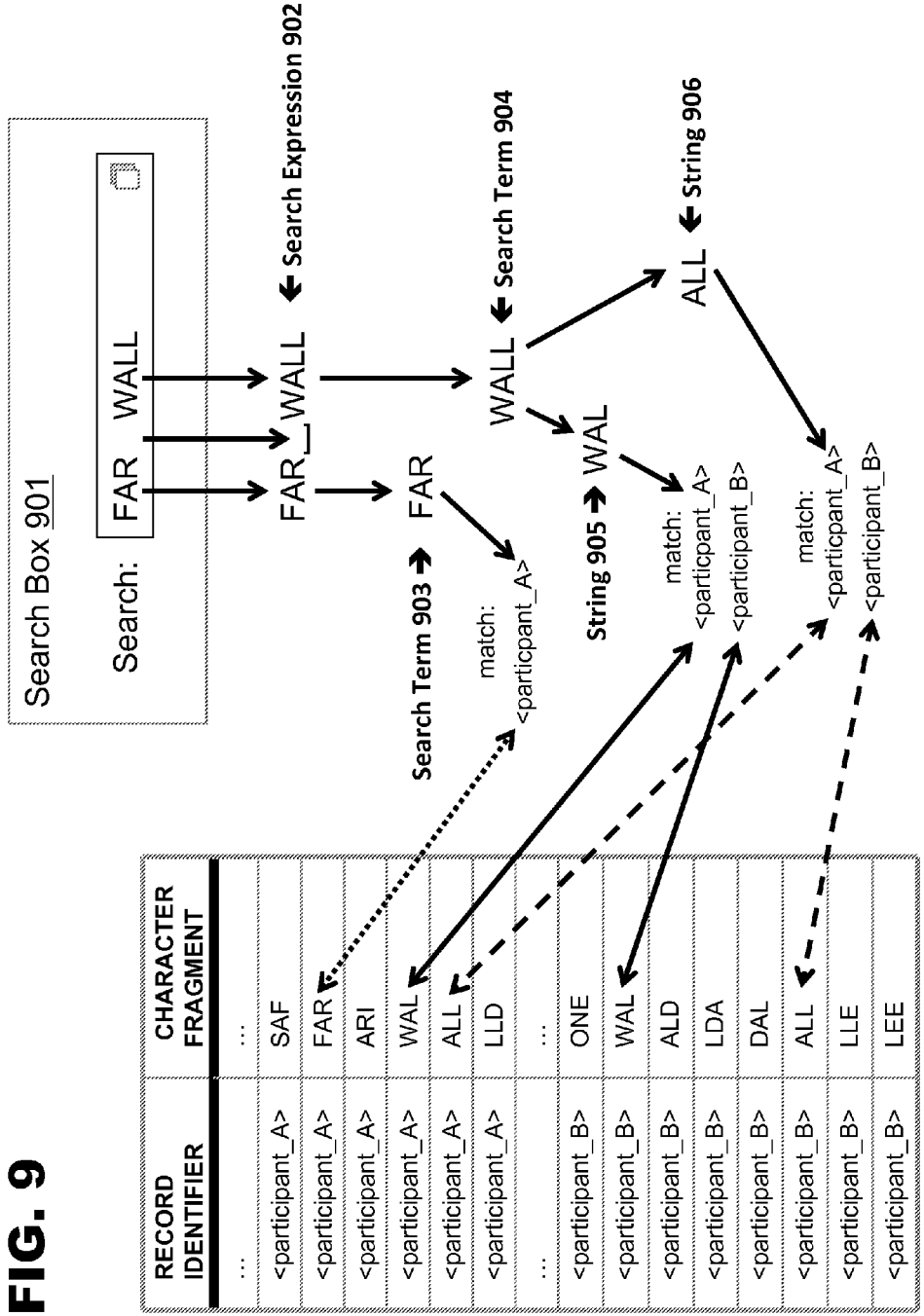
FIG. 9 shows how an exemplary search may be conducted by a processing device in an embodiment having the search indexes shown in FIGS. 5 and 6.

FIG. 9 shows how an exemplary search may be conducted by a processing device in an embodiment having the search indexes shown in FIGS. 5 and 6. A search may be initiated by having a user enter a search expression 902 into a search field, such as search box 901. Alternatively, a search may be initiated after receiving a search request containing a search expression from another application or computing system. In this example, a search expression "FAR WALL" may be submitted.

In analyzing the search expression 902, the processing device may parse the expression 902 into one or more search terms. In this case, a space may be used as a search term separator, so the parsing of the search expression may result in two search terms: "FAR" 903 and "WALL" 904. In this and other embodiments, the search index, terms, expressions, and other components may not be case sensitive, though in some embodiments, one or more components of the invention may be case sensitive.

The processing device may then start analyzing each of the search terms 903 and 904 by counting the number of characters in each term. Since the search term FAR has three alphanumeric characters, the processing device may look for matches in the search term index of FIG. 5 (an excerpt of which is also shown in the left half of FIG. 9), which also has character fragments of the same length (three characters). Since only the data record identifier <participant_A> has a character fragment matching FAR in the search index, this may be the only result corresponding to this search term, and the <participant_A> identifier may be stored in a memory.

Moving on to search term 904, WALL, since this search term is four alphanumeric characters long, the processing device may look for matches in the search term index of FIG. 5, which has character fragments of 3 characters. The search term index of FIG. 5 may be considered a best matching index, because the other index of FIG. 6 has five characters, which exceeds the length of the search term and therefore may not be used in some embodiments.

Before attempting to match the WALL search term 904, the processing device may further parse and extract adjoining character combinations from the search term that have the same length as the character fragments of the selected index in FIG. 5. Thus, the term WALL may be split into to two unique three-character adjoining strings: "WAL" 905 and "ALL" 906.

The processing device may then check the search index in FIG. 5 for matches to the string WAL. Since both data record identifiers <participant_A> and <participant_B> have linked character fragments matching WAL, both of these identifiers may be considered responsive. The processing device may also check the search index for matches to the string ALL. Since both data record identifiers <participant_A> and <participant_B> have linked character fragments matching ALL, both of these identifiers may be considered responsive.

Because our original search term was WALL, the processing device may then compare the results of the matches for both the WAL string and the ALL string to identify results common to both searches. In this case, each of the data record identifiers <participant_A> and <participant_B> have linked character fragments matching both strings 905 and 906, so both identifiers <participant_A> and <participant_B> may be classified as responsive to the search term WALL.

In other embodiments, different approaches, such as a single query approach, may also be used. In an exemplary single query, multiple fragment matching sub-queries may be concatenated into a single query, where, for example, identifiers matching the ALL fragment are intersected with identifiers match the WAL fragment, and so on. In this approach, the final results may be directly returned. In other embodiments, intermediate values, such as the results of matches for the WAL and ALL strings may be stored and further processed to generate the final results.

Although data record 213 in FIG. 2 is designated as responsive to the search term WALL through its identifier <participant_A>, none of the fields of the data record 213 actually contain the letter sequence WALL. The reason that data record 213 is marked as responsive is because the city field entry WALDALLEE contains both the three letter sequence WAL and the three letter sequence ALL. Thus, it is possible to obtain some false positives when the number of characters in a search term exceeds the length of character fragments in a search index. The number of false positives may be reduced by creating more search indexes with different character fragment lengths. The number of false positives may also be reduced by having users enter search terms with longer character lengths or enter more unique search terms in the search field.

Returning to the example, the processing device previously determined that the data record 212 with identifier <participant_A> was responsive to the search term FAR, and the data records 212 and 213 with respective identifiers <participant_A> and <participant_B> were both responsive to the search term WALL. To determine the data records responsive to the entire search expression, the processing device may designate the intersection of data record identifiers responsive to each search term in the search expression. Thus, in this example, the data record with identifier <participant_A> may be the only data record designated by the processing device as responsive to the search expression.

Other embodiments, however, may identify data records responsive to the search expression differently. For example, instead of taking the intersection of data record identifiers responsive to each search term in the search expression, a union or complement of identifiers may be considered. Additionally, various reserved words may be included in the search expression and considered when identifying records responsive to the search expression. For example, words such as AND, OR, ELSE, NOT, IF, THEN, WHILE, etc. may be included in the search expression and followed by the processing device to identify the specific records responsive to the search expression.

Figure 10:
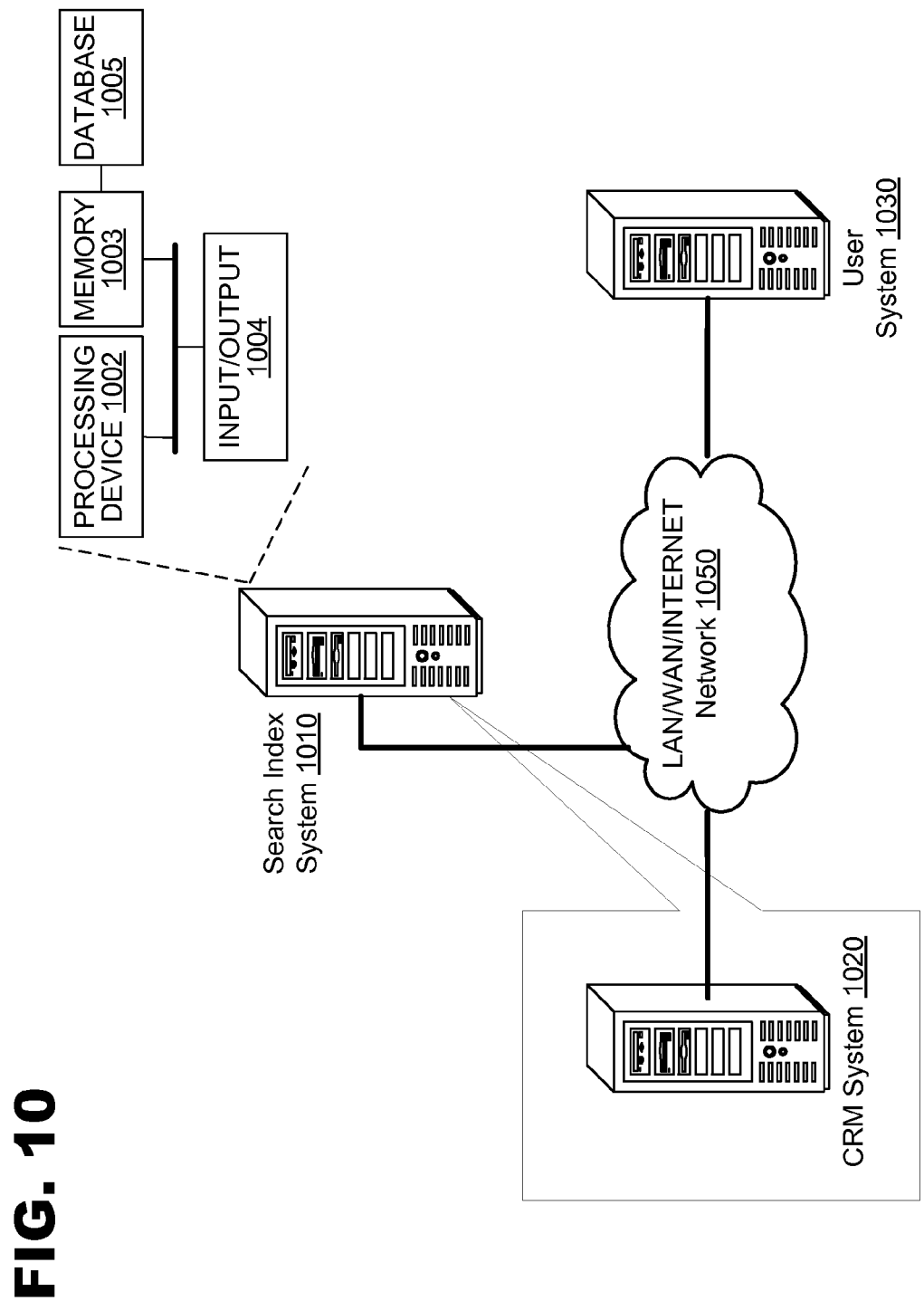
FIG. 10 shows an embodiment of a search index system.

FIG. 10 shows an embodiment of a search index system 1010 coupled to a Customer Resource Management (CRM) system 1020 and user system 1030 through a network 1050. In an embodiment, the search index system 1010 may be consolidated or integrated into other computer systems, such as the CRM system 1020, or may be part of a larger enterprise system, though in other embodiments, some or all of these systems may be separate, independent computing systems.

Each of the systems in FIG. 10 may contain a processing device 1002, memory 1003 containing a database 1005, and an input/output interface 1004, all of which may be interconnected via a system bus. In various embodiments, each of the systems 1010, 1020, and 1030 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 1003 may contain different components for retrieving, presenting, changing, and saving data. Memory 1003 may include a variety of memory devices, for example, Dynamic Random Access Memory (DRAM), Static RAM (SRAM), flash memory, cache memory, and other memory devices. Additionally, for example, memory 1003 and processing device(s) 1002 may be distributed across several different computers that collectively comprise a system.

Processing device 1002 may perform computation and control functions of a system and comprises a suitable central processing unit (CPU). Processing device 1002 may comprise a single integrated circuit, such as a microprocessing device, or may comprise any suitable number of integrated circuit devices and/or circuit boards working in cooperation to accomplish the functions of a processing device. Processing device 1002 may execute computer programs, such as object-oriented computer programs, within memory 703.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer-readable media, such as secondary storage devices, for example, hard disks, floppy disks, or CD-ROM; the Internet or other propagation medium; or other forms of RAM or ROM.

We claim:

1. A method of using a processing device comprising:
   selecting a plurality of character fragment lengths corresponding to a plurality of search indexes, each search index including a character fragment field for indexing extracted sequential fragments of adjoining characters having a unique fixed-length from data fields of a plurality of data records;
   comparing the selected character fragment lengths to a length of data in a plurality of data fields;
   extracting each sequence of adjoining characters having each of the plurality of selected lengths from data in each data field at least equal in length to each respective selected length in each data record of a data source through the processing device;
   adding each extracted sequence to the character fragment field of a corresponding one of the search indexes wherein duplicate sequences of same adjoining characters that are extracted from a same data record are included once in the search index;

extracting a word having a character length less than a lowest of the unique fixed-lengths from at least one data field;

adding the extracted word to the character fragment field of a search index associated with the lowest unique fixed-length;

linking each extracted sequence and word added to each character fragment field to an identifier of the respective data record in each respective search index through the processing device; and responsive to a receiving a search expression with a plurality of search terms:

selecting a plurality of the search indexes, and designating at least one of the identifiers in each of the selected search indexes as responsive to the search expression when the at least one identifier in each of the selected search indexes has at least one respective fixed-length character fragment matching adjoining characters in a respective search term of the search expression.

2. The method of claim 1, wherein each sequence of extracted characters contains a same order of characters as found in the respective data field.

3. The method of claim 1, wherein each sequence of extracted characters includes alphanumeric characters.

4. The method of claim 1, further comprising retrieving the identifier of each respective data record from a designated source within the data source.

5. The method of claim 1, further comprising identifying the identifier of each respective data record from a lookup table independent of the source.

6. The method of claim 1, wherein all sequences of adjoining characters having each selected length are extracted from each data field of each data record when each data field has data at least equal to a respective selected length.

7. The method of claim 1, wherein sequences of adjoining characters are not extracted from data fields with data less than the selected length.

8. The method of claim 1, wherein sequences of adjoining characters are extracted from data fields with data less than the selected length and included in the search index.

9. A method of using a processing device comprising:

parsing a search expression through the processing device to identify at least one search term;

calculating a number of characters in a each search term through the processing device;

comparing the calculated number of characters in each search term to character fragment lengths of a plurality of search indexes, each index including a character fragment field containing extracted sequential fragments of adjoining characters having a unique fixed-length from data fields of a plurality of data records wherein duplicate sequences of same adjoining characters that are extracted from a same data record are included once in the search index and wherein a word included in at least one of the data fields having a character length less than a lowest of the unique fixed-lengths is extracted and added to the character fragment field of a search index associated with the lowest unique fixed-length;

selecting a search index for each search term including character fragments of a fixed-length closest to and at most equal to the calculated number of characters through the processing device, the selected search index for each search term including a plurality of data records identifiers, each linked to at least one of the fixed-length character fragments; and designating a data record identifier as responsive to the search expression when the data record identifier in each selected search index has at least one respective fixed-length character fragment matching adjoining characters in every identified search term of the search expression.

10. The method of claim 9, further comprising calculating an intersection of data record identifiers designated as responsive to each search term in the search expression to identify a data record responsive to the search expression.

11. The method of claim 9, further comprising calculating an union of data record identifiers designated as responsive to each search term in the search expression to identify a data record responsive to the search expression.

12. The method of claim 9, further comprising calculating a complement of at least one data record identifier designated as responsive to at least one search term in the search expression to identify a data record responsive to the search expression.

13. The method of claim 9, further comprising, when the character fragment length of the selected index is less than the calculated number of characters:

extracting each sequence of adjoining characters having the character fragment length from the search term; and designating a data record identifier in the selected search index having a respective fixed-length character fragment matching at least one extracted character sequence as responsive to the search term.

14. A non-transitory computer-readable medium storing instructions that, when executed by a processing device, cause the processing device to:

select a plurality of character fragment lengths corresponding to a plurality of search indexes, each search index including a character fragment field for indexing extracted sequential fragments of adjoining characters having a unique fixed-length from data fields of a plurality of data records;

compare the selected character fragment lengths to a length of data in a plurality of data fields;

extract each sequence of adjoining characters having each of the plurality of selected lengths from data in each data field at least equal in length to each respective selected length in each data record of a data source;

adding each extracted sequence to the character fragment field of a corresponding one of the search indexes wherein duplicate sequences of same adjoining characters that are extracted from a same data record are included once in the search index;

extracting a word having a character length less than a lowest of the unique fixed-lengths from at least one data field;

adding the extracted word to the character fragment field of a search index associated with the lowest unique fixed-length;

link each extracted sequence added to the character fragment field to an identifier of the respective data record in each respective search index; and responsive to a receiving a search expression with a plurality of search terms:

select a plurality of the search indexes, and designate at least one of the identifiers in each of the selected search indexes as responsive to the search expression when the at least one identifier in each of the selected search indexes has at least one respective fixed-length character fragment matching adjoining characters in a respective search term of the search expression.

15. A non-transitory computer-readable medium storing instructions that, when executed by a processing device, cause the processing device to:

parse a search expression through the processing device to identify at least one search term;

calculate a number of characters in each search term through the processing device;

compare the calculated number of characters in each search term to character fragment lengths of a plurality of search indexes, each index including a character fragment field containing extracted sequential fragments of adjoining characters having a unique fixed-length from data fields of a plurality of data records wherein duplicate sequences of same adjoining characters that are extracted from a same data record are included once in the search index and wherein a word included in at least one of the data fields having a character length less than a lowest of the unique fixed-lengths is extracted and added to the character fragment field of a search index associated with the lowest unique fixed-length;

select a search index for each search term including character fragments of a fixed-length closest to and at most equal to the calculated number of characters through the processing device, the selected search index for each search term including a plurality of data records identifiers, each linked to at least one of the fixed-length character fragments; and designate a data record identifier as responsive to the search expression when the data record identifier in each selected search index has at least one respective fixed-length character fragment matching adjoining characters in every identified search term of the search expression.

* * * * *